United States Patent
Munige et al.

(10) Patent No.: US 11,573,368 B2
(45) Date of Patent: Feb. 7, 2023

(54) UNIVERSAL OPTICAL FIBRE WITH DOUBLE TRENCH

(71) Applicant: Sterlite Technologies Limited, Gurgaon (IN)

(72) Inventors: Srinivas Reddy Munige, Gurugram (IN); Apeksha Malviya, Gurugram (IN); Anand Kumar Pandey, Gurugram (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/316,725

(22) Filed: May 11, 2021

(65) Prior Publication Data

US 2022/0057572 A1     Feb. 24, 2022

(30) Foreign Application Priority Data

Aug. 19, 2020 (IN) .............................. 202011035782

(51) Int. Cl.
    *G02B 6/02*     (2006.01)
    *G02B 6/036*    (2006.01)
    *G02B 6/36*     (2006.01)

(52) U.S. Cl.
CPC ..... *G02B 6/02395* (2013.01); *G02B 6/03688* (2013.01); *G02B 6/3652* (2013.01)

(58) Field of Classification Search
CPC ............ G02B 6/02395; G02B 6/03688; G02B 6/3652; G02B 6/0286; G02B 6/03661
See application file for complete search history.

(56) References Cited

U.S. PATENT DOCUMENTS

| | | | | |
|---|---|---|---|---|
| 4,852,968 A | * | 8/1989 | Reed ................... | G02B 6/0365 385/127 |
| 2003/0113084 A1 | * | 6/2003 | Knudsen ............ | G02B 6/02009 385/127 |
| 2009/0290841 A1 | * | 11/2009 | Borel ................. | G02B 6/03688 385/127 |
| 2011/0026891 A1 | * | 2/2011 | Fini .................... | G02B 6/03688 385/127 |
| 2013/0136408 A1 | * | 5/2013 | Bookbinder ....... | G02B 6/03627 385/124 |
| 2013/0272668 A1 | * | 10/2013 | Sato ................... | G02B 6/03688 385/123 |
| 2013/0272670 A1 | * | 10/2013 | Frigerio ............ | C03B 37/01257 385/126 |
| 2018/0067256 A1 | * | 3/2018 | Bookbinder ....... | G02B 6/02395 |
| 2018/0095219 A1 | * | 4/2018 | Bookbinder ....... | G02B 6/02004 |
| 2018/0120503 A1 | * | 5/2018 | Bennett ............. | G02B 6/02333 |

* cited by examiner

*Primary Examiner* — Ellen E Kim

(74) *Attorney, Agent, or Firm* — Steven R. Fairchild; Michael J. Pennington

(57) ABSTRACT

The present disclosure provides an optical fibre. The optical fibre includes a core, an inner cladding, a first trench region, an intermediate cladding, a second trench region, and an outer cladding. The core has a first radius. The inner cladding is defined by the first radius and a second radius of the optical fibre. The first trench region is defined by the second radius and a third radius. The first trench region. The intermediate cladding is defined by the third radius and a fourth radius. The second trench region is defined by the fourth radius and a fifth radius. The outer cladding is defined by the fifth radius and a sixth radius.

18 Claims, 4 Drawing Sheets

100

300

UNIVERSAL OPTICAL FIBRE WITH DOUBLE TRENCH

BACKGROUND OF THE INVENTION

Field of the Invention

The present disclosure relates to the field of optical fibre transmission. More particularly, the present disclosure relates to a bend insensitive optical fibre. The present application is based on, and claims priority from an Indian Application Number 202011035782 filed on 19 Aug. 2020, the disclosure of which is hereby incorporated by reference herein

DESCRIPTION OF THE RELATED ART

With the advancement of science and technology, various modern technologies are being employed for communication purposes. One of the most important modern communication technologies is optical fibre communication technology using a variety of optical fibres. Optical fibre is used to transmit information as light pulses from one end to another. One such type of optical fibre is a single mode optical fibre. The single mode optical fibre is used in FTTx and long haul communication. The telecommunication industry is continuously striving for designs to achieve high data rate capacity and low losses. The ongoing research suggests that the single mode optical fibre of G657 and G652D category are used for FTTx and long-haul applications. The single mode optical fibre of G652D and G657 categories faces major challenges in FTTx and long haul communication respectively. G652D fibres faces major challenges in FTTx application due to good macro bend losses and G657 category fibres face major challenges in long haul applications due to high nonlinear effects as a result of low MFD. Also Low MFD in G657A2 in long haul communication results in a power penalty more than 1.5 decibel as compared to G652D.

The significantly matured G652.D category fibers have already taken millions of kms in current FTTX infrastructure. The one advantage that G652D has is its ultra-splicing capabilities but average macro-bending characteristics. To address the need to enhance the macro-bending, the G657A2 and G657A1 optical fibers have been developed and evolved. The replacement of G652.D fibers with G657.A2 or G657 A1 can be a solution. However, G657.A2 or G657 A1 has their own issues when it comes to splicing capabilities. It is usually noticed that there is a persisting problem of using G.657.A2 fibers, because of OTDR artifacts that occur when splicing them to standard single mode fibers i.e G.652D.

There is a need to develop an optical fiber that exhibits the properties of both G657A2 and G657D so as to achieve flexible splicing capability as well as good macro bend performance i.e easy splicing of G.657.A2/A1 with G.652.D. There is develop an optical fibre which would have an optimize design with good macro-bend characteristics, as well as is also compliant to current network installed G.652.D. For example, G657A2 has a mode field diameter is the range as same as mode field diameter as that of G.652.D.

In light of the above stated discussion, there is a need for a single mode optical fibre that overcomes the above sited drawbacks to use for FTTx as well as long haul and access networks.

BRIEF SUMMARY OF THE INVENTION

The present disclosure provides an optical fibre. The optical fibre includes a glass core and a glass cladding. The glass cladding surrounds the glass core. The glass cladding has an inner trench and an outer trench. The optical fibre has a mode field diameter in range of 8.7 microns to 9.7 microns at a wavelength of 1310 nanometer. The optical fibre has a macro-bend loss up to 0.5 decibel per turn corresponding to wavelength of 1550 nanometer at bending radius of 7.5 millimeter and up to 1.0 decibel per turn corresponding to wavelength of 1625 nanometer at bending radius of 7.5 millimeter.

A primary object of the present disclosure is to provide an optical fibre that exhibits optimized properties of both G657A2 and G657D so as to achieve flexible splicing capability as well as good macro bend performance.

Another object of the present disclosure is to provide the optical fibre with good macro-bend characteristics and a mode field diameter similar to that of G.652.D optical fiber to compliant to G.652.D network installed.

In an embodiment of the present invention, an optical fibre is having a glass core region defined by a core relative refractive index and is updoped, an inner glass cladding defined by an inner cladding relative refractive, an intermediate cladding defined by an intermediate cladding relative refractive index and an outer cladding defined by an outer cladding relative refractive index are relatively lightly down-doped from the glass core region and inner trench defined by an inner trench relative refractive index and outer trench defined by an outer trench relative refractive index are relatively more heavily down-doped from cladding regions.

In an embodiment of the present invention, the optical fibre having an inner trench and an outer trench separated by an intermediate cladding. Further, the inner trench, the outer trench and intermediate cladding having parameters (e.g., thickness, relative refractive index difference, and curve parameter) are chosen such that one or more fiber characteristics are improved.

In an embodiment of the present disclosure, the optical fiber parameters that can be improved by means of inner trench and outer trench are: the slope of the curve of chromatic dispersion vs. wavelength at the zero dispersion wavelength (it can be reduced); the spectral range over which the absolute value of the chromatic dispersion is less than a predetermined value (it can be increased); the maximum absolute value of the chromatic dispersion in a given spectral range (it can be decreased); the bending loss at a given bend radius (it can be decreased); the optical quality of the tube-derived material (a lossier, and therefore cheaper, material can be used); the dopant concentration in the core (it can be decreased, resulting typically in lower scattering); and the dependence of the zero dispersion wavelength on the core radius (it can be decreased, resulting in improved manufacturability).

In an embodiment of the present disclosure, the intermediate cladding that is defined by an intermediate cladding relative refractive index and the inner trench that is defined by an inner trench relative refractive index. Further the transition of delta ($\Delta$) of lower inner trench relative refractive index to higher intermediate cladding relative refractive index is designed and established to support the optical fibre having large mode filed diameter values. For example, in an embodiment of the present disclosure, the optical fibre has a mode filed dimeter from 8.7 to 9.7 at a wavelength of 1310 nanometers.

In an embodiment of the present disclosure, the optical fibre design supports large mode filed dimeter is in the range of 8.7 to 9.7 having an attenuation of 0.18 dB/km at a wavelength of 1550 nm. Further the optical fibre supports macrobend performance that exceeds the G.657.A1 standard, and mode field diameter that matches G.652.D fiber resulting improved bend performance for access-network adaptability, and backward compatibility to previous G.652.D fibres.

In an embodiment of the present disclosure, the optical fibre reduce the adverse impacts of the large mode field diameter over the macro-bending bending loss at a given bend radius by optimizing the parameters related to the inner trench, the outer trench and the intermediate cladding. Further, the outer trench is designed to mitigate the adverse effects of the large mode filed diameter that impacts and escalate the macro-bend losses. The outer trench curve parameter is in the range of 3 to 8.

Although the discussion herein is generally in terms of an optical fiber with multiple trenches for example the inner trench and the outer trench of nominally rectangular cross section, designs that comprise more than two trenches are also contemplated. With such designs it may be possible to simultaneously advantageously affect more fiber characteristics than is possible with a single trench refractive index profile.

In an embodiment of the present disclosure, the inner trench and the outer trench need not have a nominally rectangular cross section but can have any other appropriate cross section (e.g., nominally trapezoidal).

In an embodiment of the present invention, the principal advantage of such the optical fiber structure is the ease of adjusting fiber characteristics by adjustment of trench (inner trench and outer trench) placement, trench (inner trench and outer trench) width, trench (inner trench and outer trench) relative refractive index, the intermediate cladding sandwiched between inner trench and outer trench, the adjustment of the width and relative refractive index of the intermediate cladding etc. It permits design of fibers for useful wavelengths (exemplarily the region around 1310 nanometers and/or 1550 nanometers) with excellent macrobend characteristics without significant detrimental features.

In an aspect, the present disclosure provides an optical fibre. The optical fibre includes a glass core and a glass cladding. The glass cladding surrounds the glass core. The glass cladding has an inner trench and an outer trench. The optical fibre has a mode field diameter in range of 8.7 microns to 9.7 microns at a wavelength of 1310 nanometer. The optical fibre has a macro-bend loss up to 0.5 decibel per turn corresponding to wavelength of 1550 nanometer at bending radius of 7.5 millimeter and up to 1.0 decibel per turn corresponding to wavelength of 1625 nanometer at bending radius of 7.5 millimeter.

In an embodiment of the present disclosure, the inner trench and the outer trench are separated by an intermediate cladding. The intermediate cladding (108) having one or more of an intermediate cladding thickness in the range of 5 to 6 microns and an intermediate cladding relative refractive index of −0.01 to +0.01.

In an embodiment of the present disclosure, the inner trench has one or more of an inner thickness of 4 to 6 microns, an inner trench thickness in a range of 4 to 6 microns and an inner trench relative refractive index in a range of −0.15 to −0.35.

In an embodiment of the present disclosure, wherein the outer trench has one or more of an outer thickness of 4 to 6 microns, an outer trench thickness in a range of 4 to 6 microns and an outer trench relative refractive index of −0.15 to 0.35.

In an embodiment of the present disclosure, the inner trench has an inner trench curve parameter in the range of 3 to 8.

In an embodiment of the present disclosure, the outer trench has an outer trench curve parameter in the range of 3 to 8.

In an embodiment of the present disclosure, the glass cladding further includes an inner glass cladding having one of more of an inner glass cladding thickness in the range of 4 to 6 microns and an inner cladding relative refractive index of −0.01 to +0.01. Further, an outer cladding having one or more of an outer thickness of 32.8 to 42.1 microns and the outer cladding relative refractive index is zero.

In an embodiment of the present disclosure, the glass core has one or more of a core curve parameter $\alpha$ in a range of 4-10, a core radius in range of 3.5 microns to 6 microns and a core relative refractive index in range of 0.25 to 0.45.

In an embodiment of the present disclosure, the inner trench has an inner trench curve parameter in the range of 3 to 8, wherein the outer trench having an outer trench curve parameter in the range of 3 to 8.

In an embodiment of the present disclosure, the optical fiber splices with a standard single mode fiber such that the optical fiber has full compatibility with a G652.D category installed optical fibres and G657.A1 category optical fibre.

In an embodiment of the present disclosure, the optical fibre has at least one of a cable cut off wavelength of up to 1260 nanometer, a zero dispersion wavelength in range of 1300 nanometer to 1324 nanometer, and a dispersion of up to 18 picosecond/(nanometer-kilometer).

In an embodiment of the present disclosure, the optical fibre has attenuation of up to 0.18 decibel per kilometre.

In an embodiment of the present disclosure, the optical fibre has attenuation of up to 0.19 decibel per kilometre.

In an embodiment of the present disclosure, the optical fibre has at least one of a cable cut off wavelength of up to 1260 nanometer. The optical fibre has a zero dispersion wavelength in range of about 1300 nanometer to 1324 nanometer. The optical fibre has a dispersion of up to 18 picosecond/(nanometer-kilometer).

The optical fibre having double trench that are inner trench and outer trench design, wherein the first trench profile can be developed with a different development process and the second trench can be developed with a completely different development process. For example, the inner trench can be created from OVD and for outer trench developed it via tube.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
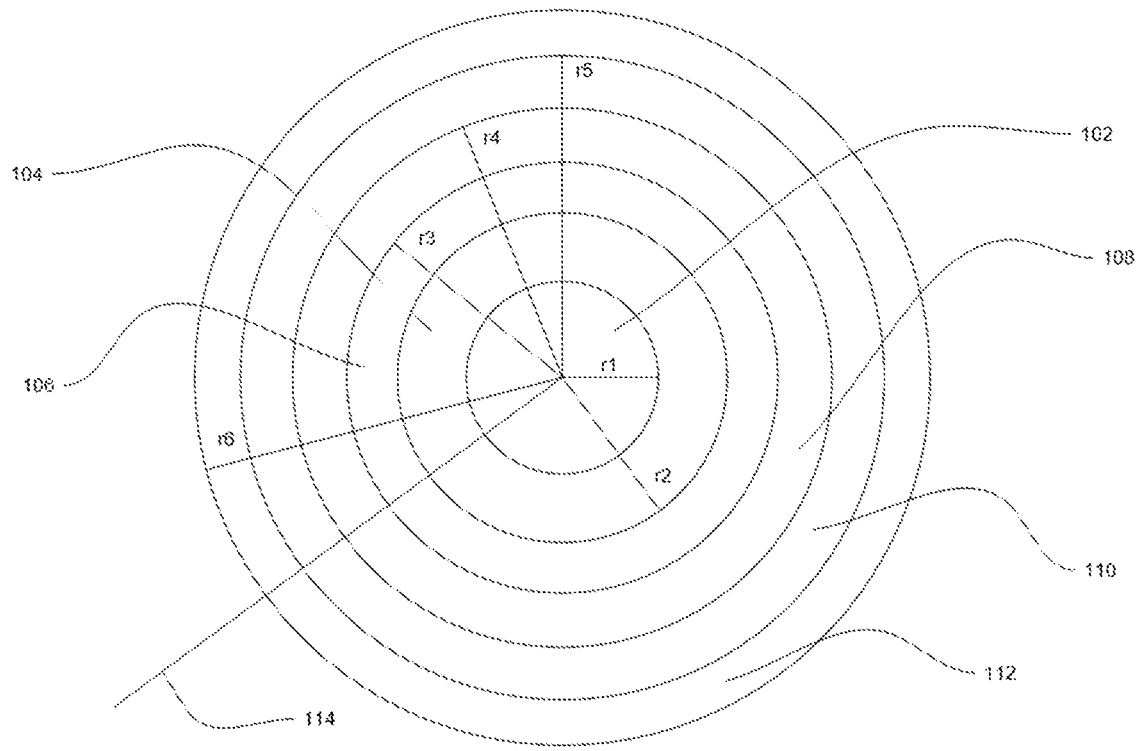
FIG. 1 illustrates a cross-sectional view of an optical fibre having dual trench and an intermediate cladding between the dual trench, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. The optical fibre.
102. Glass core.
104. Inner glass cladding.
106. Inner trench.
108. Intermediate cladding.
110. Outer trench.
112. Glass cladding.
114. Central longitudinal axis.
200. Refractive index profile.
R1. First radius.
R2. Second radius.
R3. Third radius.
R4. Fourth radius.
R5. Fifth radius.
R6. Sixth radius.
Δ1. Relative refractive index.
Δ2. Inner cladding relative refractive index.
Δ3. Inner trench relative refractive index.
Δ4. Outer trench relative refractive index.
Δ5. Fifth relative refractive index.
300. Another optical fibre.
302. Glass core.
304. Inner glass cladding.
306. Inner trench.
308. Outer trench.
310. Glass cladding.
312. Central longitudinal axis.
400. Refractive index profile.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of an optical fibre 100 having dual trench and an intermediate cladding 108 between the dual trench, in accordance with an embodiment of the present disclosure. In general, optical fibre is a thin strand of glass or plastic capable of transmitting optical signals. In an embodiment of the present disclosure, the optical fibre 100 is configured to transmit information over long distances with low non-linear effects as compared to G657A2 and good macro-bend performance. In an embodiment of the present disclosure, the optical fibre 100 exhibits optimized properties of both G657A2 and G657D so as to achieve flexible splicing capability as well as good macro bend performance. Further, the optical fibre 100 supports macro-bend performance that exceeds the G.657.A1 standard, and mode field diameter that matches G.652.D fiber resulting improved bend performance for access-network adaptability, and backward compatibility to previous G.652.D fibres.

The optical fibre 100 includes a glass core 102, an inner glass cladding 104, an inner trench 106 and an intermediate cladding 108, an outer trench 110, and a glass cladding 112.

Further, the glass core 102, the inner glass cladding 104, the inner trench 106, the intermediate cladding 108, the outer trench 110 and the glass cladding 112 of the optical fibre 100 are associated with a relative refractive index profile. The relative refractive index profile is maintained as per required level based on concentration of chemicals used for manufacturing of an optical fibre. In addition, the chemicals used for manufacturing of the optical fibre include one or more materials and one or more dopants. Further, the one or more materials and the one or more dopants are deposited over surface of initial material with facilitation of flame hydrolysis. Furthermore, the initial material is a substrate rod or a tube.

In an embodiment of the present disclosure, the refractive index profile determines relationship between a relative refractive index of the optical fibre 100 and radius of the optical fibre 100. In addition, the radius of the optical fibre 100 corresponds to a first radius $r_1$, a second radius $r_2$, a third radius $r_3$, a fourth radius $r_4$, a fifth radius $r_5$ and a sixth radius $r_6$. In an embodiment of the present disclosure, manufacturing of the optical fibre 100 is carried out after manufacturing of a preform. Further, the refractive index profile of the optical fibre 100 is determined during manufacturing of the preform of the optical fibre 100.

The optical fibre 100 includes the glass core 102. The glass core 102 is an inner part of an optical fibre and cladding is an outer part of the optical fibre. Further, the glass core 102 is defined along a central longitudinal axis 114 of the optical fibre 100. The central longitudinal axis 112 is an imaginary axis. Furthermore, the glass core 102 is central region of the optical fibre 100.

In an embodiment of the present disclosure, the glass core 102 of the optical fibre 100 has a core relative refractive index $\Delta_1$. In addition, the glass core 102 has maximum refractive index $n_{max}$. In an embodiment of the present disclosure, the glass core 102 has the core relative refractive index $\Delta_1$ in range of about 0.25 to 0.45. In another embodiment of the present disclosure, range of the core relative refractive index $\Delta_1$ may vary. Further, the glass core 102 has a core curve parameter α (alpha). In an embodiment of the present disclosure, the core curve parameter α (alpha) is in range of about 4 to 10. In another embodiment of the present disclosure, range of the core curve parameter α (alpha) may vary. Furthermore, the glass core 102 of the optical fibre 100 has the first radius $r_1$. In an embodiment of the present disclosure, the first radius $r_1$ is in range of about 3.5 microns to 6 microns. In another embodiment of the present disclosure, range of the first radius $r_1$ of the glass core 102 may vary.

The expression used for calculating the relative refractive index is produced below:

$$\Delta i = 100 \times \left( \frac{n_i^2 - n_{clad}^2}{2 \times n_i^2} \right)$$

wherein, $n_{clad}$: refractive index of the pure silica;
$n_i$: refractive index of the $i_{th}$ layer;
$\Delta i$: the relative refractive index of $i_{th}$ layer.

The optical fibre 100 includes the inner glass cladding 104. The inner glass cladding 104 concentrically surrounds the glass core 102. The inner glass cladding 102 is defined by the first radius $r_1$ and the second radius $r_2$ from the central longitudinal axis 114 of the optical fibre 100. The inner glass cladding 104 has an inner cladding relative refractive index $\Delta_2$. In an embodiment of the present disclosure, the inner glass cladding 104 of the optical fibre 100 has the second radius $r_2$ in range of about 7 microns to 12 microns. In another embodiment of the present disclosure, range of the second radius $r_2$ may vary. In an embodiment of the present disclosure, the inner glass cladding 104 of the optical fibre 100 has the inner cladding relative refractive index $\Delta_2$ is in range of about −0.01 to 0.01. In another embodiment of the present disclosure, the inner cladding relative refractive index $\Delta_2$ of the inner glass cladding 104 of the optical fibre 100 may vary. In an embodiment of the present disclosure, the inner glass cladding 104 has an inner glass cladding thickness of 3.5 to 6 microns. In another embodiment of the present disclosure, the inner glass cladding thickness of the inner glass cladding 104 may vary.

The optical fibre 100 includes the inner trench 106. The trench is also known as depressed-index ring region outside of the core of the fiber and within the cladding of the fiber. The inner trench 106 concentrically surrounds the inner glass cladding 104. The inner trench 106 is heavily down doped. The inner trench 106 is defined by the second radius $r_2$ and the third radius $r_3$ from the central longitudinal axis 114 of the optical fibre 100. In addition, the inner trench 106 has an inner trench relative refractive index $\Delta_3$. Further, the inner trench 106 has an inner trench curve parameter (alpha$_{FT}$) in the range of 3 to 8. In an embodiment of the present disclosure, the inner trench 106 of the optical fibre 100 has the third radius $r_3$ in range of about 11 to 18 microns. In another embodiment of the present disclosure, range of the third radius $r_3$ may vary. In an embodiment of the present disclosure, the inner trench 106 of the optical fibre 100 has the inner trench relative refractive index $\Delta_3$ in range of about −0.15 to −0.35. In another embodiment of the present disclosure, range of the inner trench relative refractive index $\Delta_3$ may vary. In an embodiment of the present disclosure, the inner trench 106 has an inner trench thickness in a range of 4 to 6 microns. In another embodiment of the present disclosure, the inner trench thickness of the inner trench 106 may vary. In an embodiment of the present disclosure, the inner trench 106 is of nominally rectangular cross section. In an embodiment of the present disclosure, the inner trench may have any appropriate cross section (eg, nominally trapezoidal).

The optical fibre 100 includes an intermediate cladding 108. In an embodiment of the present disclosure, the inner trench 106 and the outer trench 110 are separated by the intermediate cladding 108. The intermediate cladding 108 concentrically surrounds the inner trench 106. The intermediate cladding 108 is defined by the third radius $r_3$ and the fourth radius $r_4$. The intermediate cladding 108 has an intermediate cladding relative refractive index $\Delta_4$. In an embodiment of the present disclosure, the intermediate cladding 108 has the fourth radius $r_4$ in range of about 16 to 24 micron. In another embodiment of the present disclosure, value of the fourth radius $r_4$ may vary. In an embodiment of the present disclosure, the intermediate cladding 108 has the intermediate cladding relative refractive index $\Delta_4$ is in the range of −0.01 to 0.01. In another embodiment of the present disclosure, the intermediate cladding relative refractive index $\Delta_4$ of the intermediate cladding 108 of the optical fibre 100 may vary. In an embodiment of the present disclosure, the intermediate cladding 108 has the intermediate cladding thickness of 5 to 6 microns. In an embodiment of the present disclosure the, the optical fibre having intermediate cladding 108 placed after the inner trench 106, the intermediate cladding relative refractive index $\Delta_4$ is shifts on higher side than inner trench relative refractive index $\Delta_3$ that further extends the parameter mode filed diameter of the optical fibre on higher side and the optical fibre 100 supports the large mode field diameter range of 8.7 to 9.7 at a wavelength of 1310 nanometers. In another embodiment of the present disclosure, the intermediate cladding thickness of the intermediate cladding 108 may vary.

The optical fibre 100 includes the outer trench 110. The inner trench 106 and the outer trench 108 sandwich between the inner glass cladding 104 and the glass cladding 112. The outer trench 108 is heavily down doped. The outer trench 110 concentrically surrounds intermediate cladding 108. The outer trench 110 is defined by the fourth radius $r_4$ and the fifth radius $r_5$ from the central longitudinal axis 114. The second trench 110 has an outer trench relative refractive index $\Delta_5$. In addition, the outer trench 110 has an outer trench curve parameter (alpha$_{ST}$) in the range of 3 to 8. In an embodiment of the present disclosure, the outer trench 110 of the optical fibre 100 has the fifth radius $r_5$ in range of about 20 to 30 microns. In another embodiment of the present disclosure, range of the fifth radius $r_5$ may vary. In an embodiment of the present disclosure, the outer trench 110 of the optical fibre 100 has the outer trench relative refractive index $\Delta_5$ in range of about −0.15 to −0.35. In another embodiment of the present disclosure, range of the fifth relative refractive index $\Delta_5$ may vary. In an embodiment of the present disclosure, the outer trench 110 has an outer trench thickness in a range of 4 to 6 microns. In an embodiment of the present disclosure, the outer trench 110 thickness of the outer trench 110 may vary. The outer trench relative refractive index is in the range of −0.15 to 0.35. Further, the outer trench 110 is designed to mitigate the adverse effects of the large mode filed diameter that impacts and escalate the macrobend losses. In an embodiment of the present disclosure, the outer trench 110 is of nominally rectangular cross section. In an embodiment of the present disclosure, the outer trench 110 may have any appropriate cross section (eg, nominally trapezoidal).

The optical fibre 100 includes the glass cladding 112. The glass cladding 112 concentrically surrounds the outer trench 110. The glass cladding 112 is defined by the fifth radius $r_5$ and the sixth radius $r_6$. The glass cladding 112 has an outer cladding relative refractive index $\Delta_6$. In an embodiment of the present disclosure, the glass cladding 112 of the optical fibre 100 has the sixth radius $r_6$ is in range of about 62.1 to 62.8 microns. In another embodiment of the present disclosure, value of the sixth radius $r_6$ may vary. In an embodiment of the present disclosure, the glass cladding 112 has the outer relative refractive index $\Delta_6$ is 0. In another embodiment of the present disclosure, the outer cladding relative refractive index $\Delta_6$ of the glass cladding 112 of the optical fibre 100 may vary. In an embodiment of the present disclosure, the glass cladding has an outer cladding thickness of 32.8 to 42.1 microns.

In an embodiment of the present disclosure, the glass core 102 of the optical fibre 100 has maximum refractive index $n_{max}$. In addition, the inner glass cladding 104 has refractive index of pure silica $n_{clad}$. Further, minimum refractive index of the inner trench 106 is $n_{trench}$. Furthermore, expressions used to determine refractive index is given by below:

$$n(r) = n_{max}\left[1 - 2\Delta 1\left(\frac{r}{R1}\right)^{\alpha}\right]^{0.5}$$

for $r \leq r_1$ $n(r) = n_{clad}$ for $r_1 \leq r \leq r_2$, $r_3 \leq r \leq r_4$ and $r \leq r5$ $$n(r) = n_{clad} - n_{trench1}\left[1 + 2\Delta 3\left(\frac{(r3-r)}{(r3-r2)}\right)^{\alpha_{FT}}\right]^{0.5}$$

for $r_2 \leq r \leq r_3$ $$n(r) = n_{clad} - n_{trench2}\left[1 + 2\Delta 3\left(\frac{(r5-r)}{(r5-r4)}\right)^{\alpha_{ST}}\right]^{0.5}$$

for $r_4 \leq r \leq r_5$

In an embodiment of the present disclosure, the refractive index profile of the optical fibre 100 low non-linear effects as compared to G657A2 and good macro-bend performance. Further, the optical fibre 100 has large mode field diameter and large effective area.

In an embodiment of the present disclosure, the optical fibre 100 has a mode field diameter in range of about 8.7 microns to 9.7 microns at wavelength of 1310 nanometer. In another embodiment of the present disclosure, range of the mode field diameter of the optical fibre 100 may vary. In general, mode field diameter defines a section or area of optical fibre 100 in which the optical signals travel. In an embodiment of the present disclosure, the glass cladding 112 of the optical fibre 100 has a diameter in range of about 124.2 microns to 125.6 microns. In another embodiment of the present disclosure, the diameter of the glass cladding 112 of the optical fibre 100 may vary.

In an embodiment of the present disclosure, the optical fibre 100 has a cable cut off wavelength of up to 1260 nanometer. In another embodiment of the present disclosure, the cable cut off wavelength of the optical fibre 100 may vary. In an embodiment of the present disclosure, the optical fibre 100 has a zero dispersion wavelength in range of about 1300 nanometer to 1324 nanometer. In another embodiment of the present disclosure, range of the zero dispersion wavelength of the optical fibre 100 may vary.

In an embodiment of the present disclosure, the optical fibre 100 has a dispersion of up to 18 picosecond/(nanometer-kilometer). In another embodiment of the present disclosure, the dispersion of the optical fibre 100 may vary. In an embodiment of the present disclosure, the optical fibre 100 has attenuation less than or equal to 0.19 decibel per kilometer. In another embodiment of the present disclosure, the optical fibre 100 has attenuation of up to 0.18 decibel per kilometre. In yet another embodiment of the present disclosure, attenuation of the optical fibre 100 may vary.

The optical fibre 100 has macro-bend loss in complaint to the ITUT G657.A2. In addition, the optical fibre 100 has a primary coating and a secondary coating. The optical fibre has an outer diameter. The outer diameter corresponds to outer diameter of the optical fibre 100 along with the primary coating and the secondary coating. In an example, the outer diameter of the optical fibre 100 along with the primary coating and the secondary coating is about 250 microns. In another example, the outer diameter of the optical fibre 100 along with the primary coating and the secondary coating is about 200 microns. In yet another example, the outer diameter of the optical fibre 100 along with the primary coating and the secondary coating is about 180 microns. In yet another example, the outer diameter of the optical fibre 100 along with the primary coating and the secondary coating is about 160 microns. In another example, the outer diameter of the optical fibre 100 along with the primary coating and the secondary coating may vary.

In general, bending loss is a loss that occurs when optical fibre is bent. In addition, bending loss includes macro-bend loss and a micro-bend loss. The optical fibre 100 has a macro-bend loss up to 0.047 decibel per turn corresponding to wavelength of 1550 nanometer at bending radius of 7.5 millimeter and up to 0.107 decibel per turn corresponding to wavelength of 1625 nanometer at bending radius of 7.5 millimeter. In an example, the optical fibre 100 has macro-bend loss up to 0.1 decibel per turn corresponding to wavelength of 1550 nanometer at bending radius of 10 millimeter. In another example, the optical fibre 100 macro-bend loss up to 0.2 decibel per turn corresponding to wavelength of 1625 nanometer at bending radius of 10 millimeter. In yet another example, the optical fibre 100 has macro-bend loss up to 0.03 decibel per 10 turn corresponding to wavelength of 1550 nanometer at bending radius of 15 millimeter. In yet another example, the optical fibre 100 has macro-bend loss up to 0.1 decibel per 10 turn corresponding to wavelength of 1625 nanometer at bending radius of 15 millimeter. In general, bending radius is a minimum radius of the inner curvature formed on bending optical fibre. Further, the optical fibre 100 has a core clad concentricity error of up to 0.5. Further, the optical fibre 100 has cladding non-circularity percentage of up to 0.7 percent. Further, the optical fibre 100 has a zero dispersion slope of up to 0.092 picosecond (nanometer2.kilometer).

In an embodiment of the present disclosure, the optical fibre 100 has a prof testing is at least 100 kpsi or more. Further, the optical fibre 100 has a coating strip force is in between 0.3 to 5.0 Newton. Further, the optical fibre 100 has a fiber curl in is at least 4 meters or more. Further, the optical fibre 100 has coatings cladding Concentricity error of up to 12 micro meters.

In an embodiment of the present disclosure, the optical fibre 100 is compliant with G657.A2 bend-insensitive fiber that splices seamlessly with standard single mode fibers. Further the optical fiber 100 is compliant with G657.A2 bend insensitive fibre, has an optimized design with the same mode field diameter as standard G.652.D fibers to ensure full compatibility with a G.652.D installed optical fibre base. In an embodiment of the present disclosure the optical fibre 100 enables next-level cable designs and bend performance, while streamlining field optical time domain reflectometer (OTDR) testing protocols. In an embodiment of the present disclosure, the optical fibre 100 has extreme bend performance of a G.657A2 category optical fiber with the splicing convenience of a G.657.A1 design.

In an embodiment of the present disclosure, the optical fibre 100 has a bend-insensitive property that assists in conserving optical power in closures and other locations where bending losses can quickly add up, further improving optical power margins.

Figure 2:
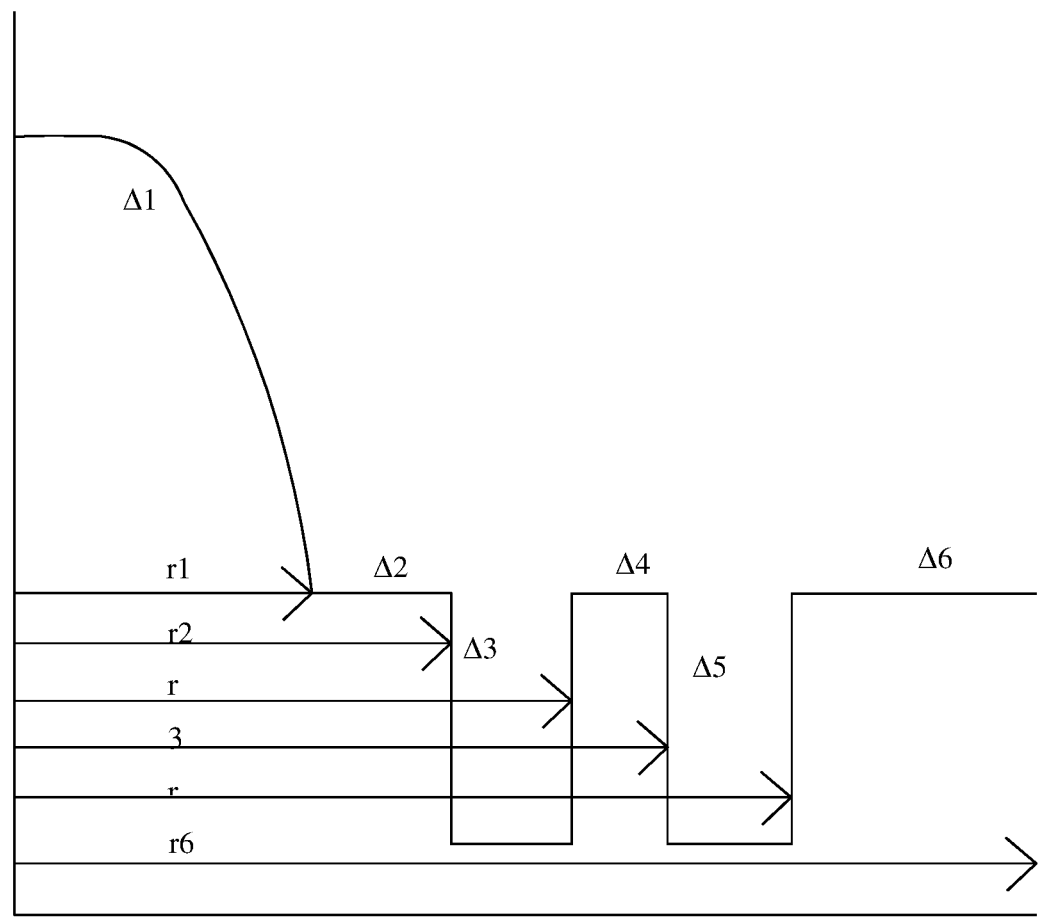
FIG. 2 illustrates a refractive index profile of the optical fibre of FIG. 1, in accordance with an embodiments of the present disclosure.

FIG. 2 illustrates the refractive index profile 200 of the optical fibre 100 of FIG. 1, in accordance with an embodiment of the present disclosure. The refractive index profile 200 illustrates relationship between the refractive index of the optical fibre 100 and the radius of the optical fibre 100 (as shown in FIG. 1). In an embodiment of the present disclosure, the refractive index profile 200 shows change in the relative refractive index of glass core 102, the inner glass cladding 104, the inner trench 106, intermediate cladding 108, the outer trench 110 and the glass cladding 112 with the radius of the optical fibre 100.

In addition, the optical fibre 100 has the mode field diameter. In an example, the mode field diameter is about 9.08 micron at wavelength of 1310 nanometer. In another example, the mode field diameter is about 9.12 micron at wavelength of 1310 nanometer. Further, the optical fibre 100 has the zero dispersion wavelength. In an example, the zero dispersion wavelength is about 1308 nanometer. In another example, the zero dispersion wavelength is about 1300 nanometer. In yet another example, the zero dispersion wavelength is about 1313 nanometer. In yet another example, the zero dispersion wavelength is about 1317 nanometer. Furthermore, the optical fibre 100 has the dispersion. In an example, the dispersion is about 15 picosecond/(nanometer-kilometer) at wavelength of 1550 nanometer. In another example, the dispersion is about 17.3 picosecond/(nanometer-kilometer) at wavelength of 1550 nanometer. In yet another example, the dispersion is about 15 picosecond/(nanometer-kilometer) at wavelength of 1550 nanometer. In yet another example, the dispersion is about 17 picosecond/(nanometer-kilometer) at wavelength of 1550 nanometer. In yet another example, the dispersion is about 18 picosecond/(nanometer-kilometer) at wavelength of 1550 nanometer.

Moreover, the optical fibre 100 has the cable cut off wavelength. In an example, the cable cutoff wavelength is about 1206 nanometer. In another example, the cable cutoff wavelength is about 1230 nanometer. In yet another example, the cable cutoff wavelength is about 1240 nanometer. In yet another example, the cable cutoff wavelength is about 1210 nanometer. Also, the optical fibre 100 is associated with macro-bend loss. In an example, macro-bend loss of the optical fibre 100 is about 0.03 decibel per turn corresponding to wavelength of 1550 nanometer at bending radius of 7.5 millimeter. In another example, macro-bend loss of the optical fibre 100 is about 0.16 decibel per turn corresponding to wavelength of 1550 nanometer at bending radius of 7.5 millimeter. In yet another example, macro-bend loss of the optical fibre 100 is about 0.13 decibel per turn corresponding to wavelength of 1550 nanometer at bending radius of 7.5 millimeter. In yet another example, macro-bend loss of the optical fibre 100 is about 0.08 decibel per turn corresponding to wavelength of 1550 nanometer at bending radius of 7.5 millimeter.

In an example, macro-bend loss of the optical fibre 100 is about 0.07 decibel per turn corresponding to wavelength of 1625 nanometer at bending radius of 7.5 millimeter. In another example, macro-bend loss of the optical fibre 100 is about 0.37 decibel per turn corresponding to wavelength of 1625 nanometer at bending radius of 7.5 millimeter. In yet another example, macro-bend loss of the optical fibre 100 is about 0.28 decibel per turn corresponding to wavelength of 1625 nanometer at bending radius of 7.5 millimeter. In yet another example, macro-bend loss of the optical fibre 100 is about 0.19 decibel per turn corresponding to wavelength of 1625 nanometer at bending radius of 7.5 millimeter.

In an example, macro-bend loss of the optical fibre 100 is about 0.013 decibel per turn corresponding to wavelength of 1550 nanometer at bending radius of 10 millimeter. In another example, macro-bend loss of the optical fibre 100 is about 0.031 decibel per turn corresponding to wavelength of 1550 nanometer at bending radius of 10 millimeter. In yet another example, macro-bend loss of the optical fibre 100 is about 0.047 decibel per turn corresponding to wavelength of 1550 nanometer at bending radius of 10 millimeter. In yet another example, macro-bend loss of the optical fibre 100 is about 0.035 decibel per turn corresponding to wavelength of 1550 nanometer at bending radius of 10 millimeter.

In an example, macro-bend loss of the optical fibre 100 is about 0.035 decibel per turn corresponding to wavelength of 1625 nanometer at bending radius of 10 millimeter. In another example, macro-bend loss of the optical fibre 100 is about 0.086 decibel per turn corresponding to wavelength of 1625 nanometer at bending radius of 10 millimeter. In yet another example, macro-bend loss of the optical fibre 100 is about 0.139 decibel per turn corresponding to wavelength of 1625 nanometer at bending radius of 10 millimeter. In yet another example, macro-bend loss of the optical fibre 100 is about 0.103 decibel per turn corresponding to wavelength of 1625 nanometer at bending radius of 10 millimeter.

In an example, macro-bend loss of the optical fibre 100 is about 0.007 decibel per 10 turn corresponding to wavelength of 1550 nanometer at bending radius of 15 millimeter. In another example, macro-bend loss of the optical fibre 100 is about 0.015 decibel per 10 turn corresponding to wavelength of 1550 nanometer at bending radius of 15 millimeter. In yet another example, macro-bend loss of the optical fibre 100 is about 0.016 decibel per 10 turn corresponding to wavelength of 1550 nanometer at bending radius of 15 millimeter. In yet another example, macro-bend loss of the optical fibre 100 is about 0.013 decibel per 10 turn corresponding to wavelength of 1550 nanometer at bending radius of 15 millimeter.

In an example, macro-bend loss of the optical fibre 100 is about 0.034 decibel per 10 turn corresponding to wavelength of 1625 nanometer at bending radius of 15 millimeter. In another example, macro-bend loss of the optical fibre 100 is about 0.069 decibel per 10 turn corresponding to wavelength of 1625 nanometer at bending radius of 15 millimeter. In yet another example, macro-bend loss of the optical fibre 100 is about 0.076 decibel per 10 turn corresponding to wavelength of 1625 nanometer at bending radius of 15 millimeter. In yet another example, macro-bend loss of the optical fibre 100 is about 0.062 decibel per 10 turn corresponding to wavelength of 1625 nanometer at bending radius of 15 millimeter.

Figure 3:
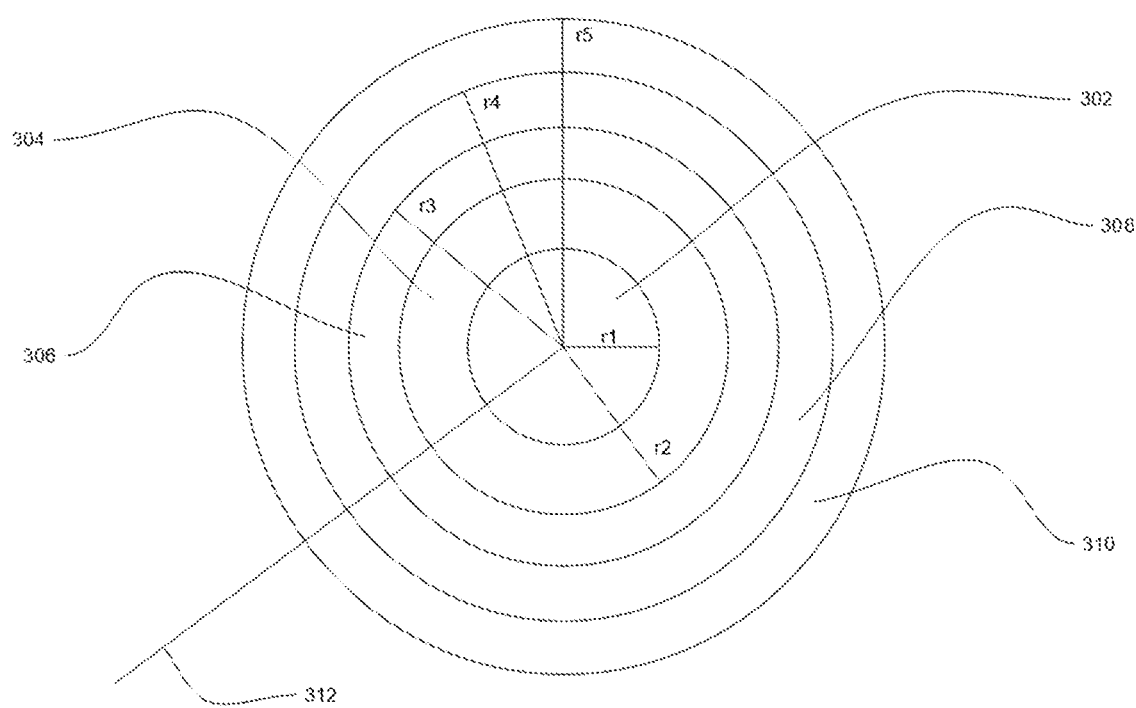
FIG. 3 illustrates another optical fibre having a dual trench without an intermediate cladding between the dual trench, in accordance with another embodiment of the present disclosure.

FIG. 3 illustrates a cross-sectional view of another optical fibre 300 having dual trench without intermediate cladding between the dual trench, in accordance with another embodiment of the present disclosure. The optical fibre 300 is similar to the optical fibre 100 of FIG. 1.

The optical fibre 300 includes a glass core 302, an inner glass cladding 304, an inner trench 306, an outer trench 308, and a glass cladding 310. The optical fibre 300 does not include any intermediate cladding.

Further, the glass core 302, the inner glass cladding 304, the inner trench 306, the outer trench 308 and the glass cladding 310 of the optical fibre 300 are associated with a refractive index profile. The refractive index profile is maintained as per required level based on concentration of chemicals used for manufacturing of an optical fibre. In addition, the chemicals used for manufacturing of the optical fibre include one or more materials and one or more dopants. Further, the one or more materials and the one or more dopants are deposited over surface of initial material with facilitation of flame hydrolysis. Furthermore, the initial material is a substrate rod or a tube.

In an embodiment of the present disclosure, the refractive index profile determines relationship between a refractive index of the optical fibre 300 and radius of the optical fibre 300. In addition, the radius of the optical fibre 300 corresponds to a first radius $r_1$, a second radius $r_2$, a third radius $r_3$, a fourth radius $r_4$, and a fifth radius $r_5$. In an embodiment of the present disclosure, manufacturing of the optical fibre 300 is carried out after manufacturing of a preform. Further, the refractive index profile of the optical fibre 300 is determined during manufacturing of the preform of the optical fibre 300.

The optical fibre 300 includes the glass core 302. The glass core 302 is an inner part of an optical fibre and cladding is an outer part of the optical fibre. Further, the glass core 302 is defined along a central longitudinal axis 312 of the optical fibre 300. The central longitudinal axis 312 is an imaginary axis.

In an embodiment of the present disclosure, the glass core 302 of the optical fibre 300 has a core relative refractive index $\Delta_1$. In addition, the glass core 302 has maximum refractive index $n_{max}$. In an embodiment of the present disclosure, the glass core 302 has the core relative refractive index $\Delta_1$ in range of about 0.25 to 0.45. In another embodiment of the present disclosure, range of the core relative refractive index $\Delta_1$ may vary. Further, the glass core 302 has a core curve parameter α (alpha). In an embodiment of the present disclosure, the core curve parameter α (alpha) is in range of about 4 to 10. In another embodiment of the present disclosure, range of the core curve parameter α (alpha) may vary. Furthermore, the glass core 302 of the optical fibre 300 has the first radius $r_1$. In an embodiment of the present disclosure, the first radius $r_1$ is in range of about 3.5 microns to 6 microns. In another embodiment of the present disclosure, range of the first radius $r_1$ of the glass core 302 may vary.

The expression used for calculating the relative refractive index is produced below:

$$\Delta i = 100 \times \left( \frac{n_i^2 - n_{clad}^2}{2 \times n_i^2} \right)$$

wherein, $n_{clad}$: refractive index of the pure silica;
$n_i$: refractive index of the $i_{th}$ layer;
$\Delta i$: the relative refractive index of $i_{th}$ layer.

In an embodiment of the present disclosure, the refractive index profile changes between the first radius $r_1$ and the fifth radius $r_5$ of the optical fibre 300. Further, the relative refractive index of the glass core 302, the inner glass cladding 304, the inner trench 306, the outer trench 108, and the glass cladding 310 of the optical fibre 300 has a pre-defined value. Furthermore, the radius of the glass core 302, the inner glass cladding 304, the inner trench 306, the outer trench 308, and the glass cladding 310 of the optical fibre 300 has a pre-defined value. In an embodiment of the present disclosure, the pre-defined values of the relative refractive index are set to obtain good macro-bend performance and reduce non-linear effects as compared to G657A2.

The optical fibre 300 includes the inner glass cladding 304. The inner glass cladding 304 concentrically surrounds the glass core 302. The inner glass cladding 304 is defined by the first radius $r_1$ and the second radius $r_2$ from the central longitudinal axis 312 of the optical fibre 300. The inner glass cladding 304 has an inner cladding relative refractive index $\Delta_2$. In an embodiment of the present disclosure, the inner glass cladding 304 of the optical fibre 300 has the second radius $r_2$ in range of about 7 microns to 12 microns. In another embodiment of the present disclosure, range of the second radius $r_2$ may vary. In an embodiment of the present disclosure, the inner glass cladding 304 of the optical fibre 100 has the inner cladding relative refractive index $\Delta_2$ is in range of about −0.01 to 0.01. In another embodiment of the present disclosure, the inner cladding relative refractive index $\Delta_2$ of the inner glass cladding 304 of the optical fibre 300 may vary. In an embodiment of the present disclosure, the inner glass cladding 304 has an inner glass cladding thickness of 3.5 to 6 microns. In another embodiment of the present disclosure, the inner glass cladding thickness of the inner glass cladding 304 may vary.

The optical fibre 300 includes the inner trench 306. The inner trench 306 concentrically surrounds the inner glass cladding 304. The inner trench 306 is defined by the second radius $r_2$ and the third radius $r_3$ from the central longitudinal axis 312 of the optical fibre 300. In addition, the inner trench 306 has an inner trench relative refractive index $\Delta_3$. Further, the inner trench 306 has a first alpha (alpha$_{FT}$) in the range of 3 to 8. In an embodiment of the present disclosure, the inner trench 306 of the optical fibre 300 has the third radius $r_3$ in range of about 11 to 22 microns. In another embodiment of the present disclosure, range of the third radius $r_3$ may vary. In an embodiment of the present disclosure, the inner trench 306 of the optical fibre 300 has the inner trench relative refractive index $\Delta_3$ in range of about −0.1 to −0.35. In another embodiment of the present disclosure, range of the inner trench relative refractive index $\Delta_3$ may vary. In an embodiment of the present disclosure, the inner trench 306 has an inner trench thickness in a range of 4 to 10 microns. In another embodiment of the present disclosure, the inner trench thickness of the inner trench 306 may vary.

The optical fibre 300 includes the outer trench 308. The outer trench 308 concentrically surrounds the inner trench 306. The outer trench 308 is defined by the third radius $r_3$ and the fourth radius $r_4$ from the central longitudinal axis 312. The outer trench 308 has an outer trench relative refractive index $\Delta_4$. In addition, the outer trench 308 has a second alpha (alpha$_{ST}$) in the range of 3 to 8. (Kindly provide value of the second alpha) In an embodiment of the present disclosure, the outer trench 308 of the optical fibre 300 has the fourth radius $r_4$ in range of about 14 microns to 25 microns. In another embodiment of the present disclosure, range of the fifth radius $r_5$ may vary. In an embodiment of the present disclosure, the outer trench 308 of the optical fibre 300 has the outer trench relative refractive index $\Delta_4$ in range of about −0.1 to −0.35. In another embodiment of the present disclosure, range of the outer trench relative refractive index $\Delta_4$ may vary. In an embodiment of the present disclosure, the outer trench 308 has an outer trench thickness in a range of up to 3 microns. In an embodiment of the present disclosure, the outer trench thickness of the outer trench 308 may vary.

The optical fibre 300 includes the glass cladding 310. The glass cladding 310 concentrically surrounds the outer trench 308. The glass cladding 310 is defined by the fourth radius $r_4$ and the fifth radius $r_5$. The glass cladding 310 has an outer cladding relative refractive index $\Delta_5$. In an embodiment of the present disclosure, the glass cladding 310 of the optical fibre 300 has the fifth radius $r_5$ in range of about 62.1 to 62.8 microns. In another embodiment of the present disclosure, value of the fifth radius $r_5$ may vary. In an embodiment of the present disclosure, the glass cladding 310 has the outer cladding relative refractive index $\Delta_5$ is 0. In another embodiment of the present disclosure, the outer cladding relative refractive index $\Delta_5$ of the glass cladding 310 of the optical fibre 300 may vary. In an embodiment of the present disclosure, the glass cladding 310 has an outer cladding thickness of 37.8 to 48.1

In an embodiment of the present disclosure, the glass core 302 of the optical fibre 300 has maximum refractive index $n_{max}$. In addition, the inner glass cladding 304 has refractive index of pure silica $n_{clad}$. Further, minimum refractive index of the inner trench 306 is $n_{trench}$. Furthermore, expressions used to determine refractive index is given by below:

$$n(r) = n_{max}\left[1 - 2\Delta 1\left(\frac{r}{R1}\right)^{\alpha}\right]^{0.5}$$

for $r \leq r_1$ $n(r) = n_{clad}$ for $r_1 \leq r \leq r_2$ and $r \geq r4$ $$n(r) = n_{clad} - n_{trench1}\left[1 + 2\Delta 3\left(\frac{(r3 - r)}{(r3 - r2)}\right)^{\alpha_{FT}}\right]^{0.5}$$

for $r_2 \leq r \leq r_3$ $$n(r) = n_{clad} - n_{trench2}\left[1 + 2\Delta 3\left(\frac{(r4 - r)}{(r4 - r3)}\right)^{\alpha_{ST}}\right]^{0.5}$$

for $r_3 \leq r \leq r_4$

In an embodiment of the present disclosure, the optical fibre 300 has a mode field diameter in range of about 8.7 microns to 9.7 microns at wavelength of 1310 nanometer. In another embodiment of the present disclosure, range of the mode field diameter of the optical fibre 300 may vary. In an embodiment of the present disclosure, the optical fibre 300 has attenuation less than or equal to 0.19 decibel per kilometer. In another embodiment of the present disclosure, the optical fibre 300 has attenuation of up to 0.18 decibel per kilometre. In yet another embodiment of the present disclosure, attenuation of the optical fibre 300 may vary. The optical fibre 300 has a macro-bend loss up to 0.047 decibel per turn corresponding to wavelength of 1550 nanometer at bending radius of 7.5 millimeter and up to 0.107 decibel per turn corresponding to wavelength of 1625 nanometer at bending radius of 7.5 millimeter.

Figure 4:
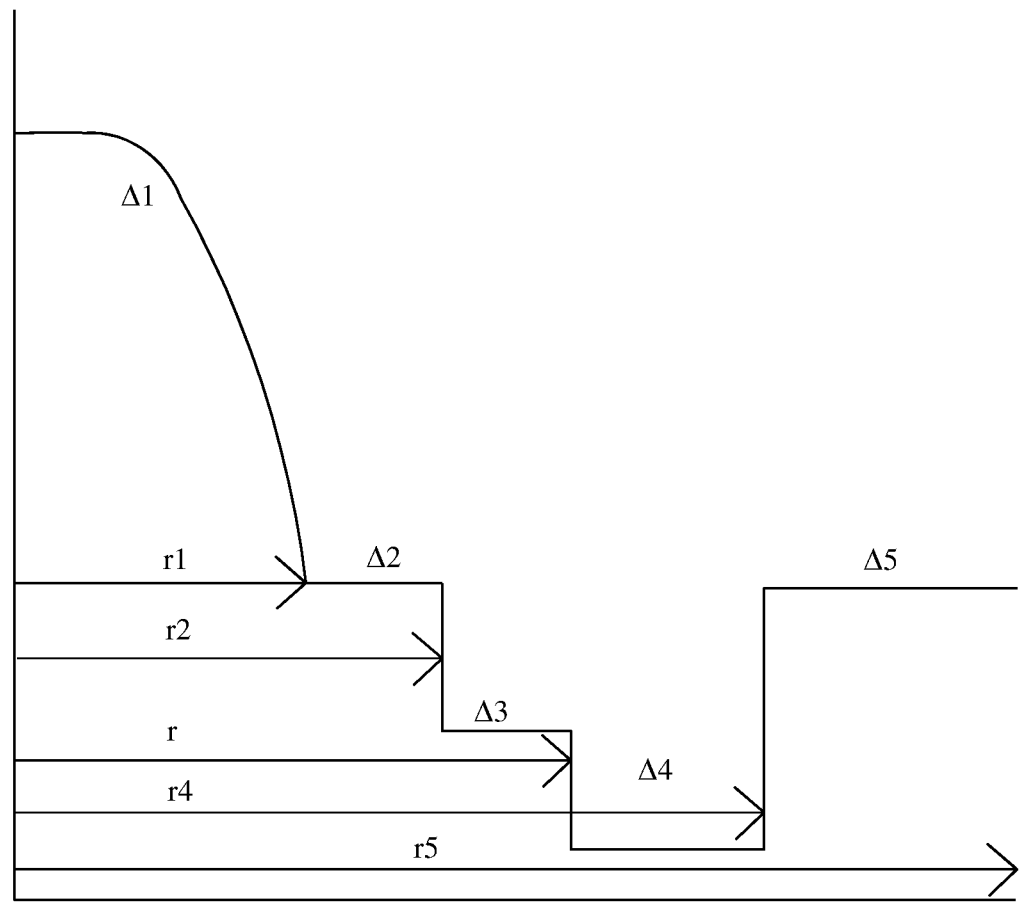
FIG. 4 illustrates a refractive index profile of the optical fibre of FIG. 3, in accordance with another embodiment of the present disclosure.

FIG. 4 illustrates a refractive index profile 400 of the optical fibre 300 of FIG. 3, in accordance with another embodiment of the present disclosure. The refractive index profile 400 illustrates relationship between the refractive index of the optical fibre 100 and the radius of the optical fibre 300 (as shown in FIG. 3). In an embodiment of the present disclosure, the refractive index profile 400 shows change in the relative refractive index core 302, the inner glass cladding 304, the inner trench 306, the outer trench 308 and the glass cladding 310 with the radius of the optical fibre 300.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An optical fibre comprising:
a glass core defined by a core refractive index profile;
a glass cladding surrounding the glass core, wherein the glass cladding is defined by a cladding relative refractive index wherein the cladding relative refractive index has an inner trench and an outer trench, wherein the inner trench and the outer trench are down doped relative to the cladding relative refractive index, wherein the optical fibre has a mode field diameter in range of 8.7 microns to 9.7 microns at a wavelength of 1310 nanometer, wherein the optical fibre has a macrobend loss up to 0.5 decibel per turn corresponding to wavelength of 1550 nanometer at bending radius of 7.5 millimeter and up to 0.1 decibel per turn corresponding to wavelength of 1625 nanometer at bending radius of 7.5 millimeter, wherein the glass cladding comprising:
an inner glass cladding defined by one or more of an inner glass cladding thickness in range of 4 to 6 microns and an inner cladding relative refractive index of −0.01 to +0.01; and
an outer cladding defined by one or more of an outer cladding thickness of 32.8 to 42.1 microns and an outer cladding relative refractive index is zero.

2. The optical fibre as claimed in claim 1 wherein the cladding refractive index profile further comprising an intermediate cladding separating the inner trench and the outer trench, wherein the intermediate cladding is defined by one or more of an intermediate cladding thickness in the range of 5 to 6 microns and an intermediate cladding relative refractive index of −0.01 to +0.01.

3. The optical fibre as claimed in claim 1, wherein the inner trench is defined by one or more of an inner thickness of 4 to 6 microns, an inner trench curve parameter in the range of 3 to 8 and an inner trench relative refractive index in a range of −0.15 to −0.35.

4. The optical fibre as claimed in claim 1, wherein the outer trench is defined by one or more of an outer thickness of 4 to 6 microns, an outer trench curve parameter in the range of 3 to 8 and an outer trench relative refractive index of 0.15 to 0.35.

5. The optical fibre as claimed in claim 1, wherein a core radius is in range of 3.5 microns to 6 microns and a core relative refractive index in range of 0.25 to 0.45.

6. The optical fibre as claimed in claim 1, wherein the inner trench has an inner trench curve parameter in the range of 3 to 8.

7. The optical fibre as claimed in claim 1, wherein the outer trench having an outer trench curve parameter in the range of 3 to 8.

8. The optical fibre as claimed in claim 1, wherein the optical fiber splices with a standard single mode fiber.

9. The optical fibre as claimed in claim 1, wherein the optical fibre has at least one of a cable cut off wavelength of up to 1260 nanometer, a zero dispersion wavelength in range of 1300 nanometer to 1324 nanometer, and a dispersion of up to 18 picosecond (nanometer-kilometer).

10. An optical fibre comprising:
a glass core defined by a core refractive index profile;
a glass cladding surrounding the glass core, wherein the glass cladding is defined by a cladding relative refractive index wherein the cladding relative refractive index has an inner trench and an outer trench, wherein the inner trench and the outer trench are down doped relative to the cladding relative refractive index, wherein the optical fibre has a mode field diameter in range of 8.7 microns to 9.7 microns at a wavelength of 1310 nanometer, wherein the glass cladding comprising:
an inner glass cladding defined by one or more of an inner glass cladding thickness in range of 4 to 6 microns and an inner cladding relative refractive index of −0.01 to +0.01; and
an outer cladding defined by one or more of an outer cladding thickness of 32.8 to 42.1 microns and an outer cladding relative refractive index is zero.

11. The optical fibre as claimed in claim 10 wherein the cladding refractive index profile further comprising an intermediate cladding separating the inner trench and the outer trench, wherein the intermediate cladding is defined by one or more of an intermediate cladding thickness in the range of 5 to 6 microns and an intermediate cladding relative refractive index of −0.01 to +0.01.

12. The optical fibre as claimed in claim 10, wherein the inner trench is defined by one or more of an inner thickness of 4 to 6 microns, an inner trench curve parameter in the range of 3 to 8 and an inner trench relative refractive index in a range of −0.15 to −0.35.

13. The optical fibre as claimed in claim 10, wherein the outer trench is defined by one or more of an outer thickness of 4 to 6 microns, an outer trench curve parameter in the range of 3 to 8 and an outer trench relative refractive index of 0.15 to 0.35.

14. The optical fibre as claimed in claim 10, wherein the glass core defined by one or more of a core radius in range of 3.5 microns to 6 microns and a core relative refractive index in range of 0.25 to 0.45.

15. The optical fibre as claimed in claim 10, wherein the inner trench has an inner trench curve parameter in the range of 3 to 8.

16. The optical fibre as claimed in claim 10, wherein the outer trench having an outer trench curve parameter in the range of 3 to 8.

17. The optical fibre as claimed in claim 10, wherein the optical fiber splices with a standard single mode fiber.

18. The optical fibre as claimed in claim 10, wherein the optical fibre has at least one of a cable cut off wavelength of up to 1260 nanometer, a zero dispersion wavelength in range of 1300 nanometer to 1324 nanometer, and a dispersion of up to 18 picosecond (nanometer-kilometer).

* * * * *